Patented Nov. 14, 1939

2,180,246

UNITED STATES PATENT OFFICE 2,180,246

DISAZO DYESTUFFS AND THEIR MANUFACTURE

Adolf Krebser, Riehen, near Basel, Switzerland, assignor to the firm J. R. Geigy A. G., Basel, Switzerland No Drawing. Application May 10, 1938, Serial No. 207,149. In Switzerland May 19, 1937

5 Claims. (Cl. 260—191)

This invention relates to the manufacture of valuable disazo dyestuffs which dye animal fibres red- to bluish-violet shades of very good fastness to light.

The new disazo dyestuffs probably correspond with the general formula

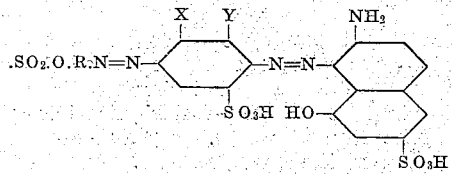

wherein

X represents hydrogen, an alkyl- or alkoxy-group,

Y represents hydrogen or an alkoxy-group, one of X and Y being at the most different from H, R represents the residue of a phenol, coupled in the p-position, and A represents an aromatic residue of the benzene series.

The new dyestuffs exhibit the advantage of better light fastness in comparison with known disazo-dyestuffs, especially those of the benzidine series, containing a phenol coupled in the p-position and being esterified with aryl sulpho-chlorides.

According to the present invention these new dyestuffs are produced, either from the mono-azo dyestuffs

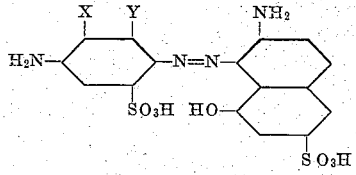

by diazotising and combining with a phenol capable of being coupled in the p-position and subsequent treatment with an aryl sulpho-chloride of the benzene series; or from the diazo compounds of the mono-azo dyestuffs

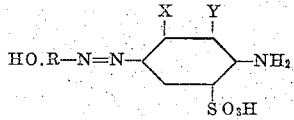

by coupling in acid solution with 2:8-amino-naphthol-6-sulphonic acid and esterifying with an aryl sulpho-chloride of the benzene series. The symbols X, Y and R in these formulae have the above defined meanings.

Example 1

43.8 kg. of the mono-azo dyestuff p-phenylene diamine-o-sulphonic acid-azo-2:8-amino-naphthol-6-sulphonic acid (obtained for example by known processes by coupling diazotised 4-nitraniline-6-sulphonic acid with 2:8-amino-naphthol-6-sulphonic acid in acid solution and reduction with sodium sulphide, or by coupling diazotised 4-acetyl-amino-1-amino-benzene-6-sulphonic acid with 2:8-amino-naphthol-6-sulphonic acid in acid solution and saponifying) are diazotised with 7 kg. of sodium nitrite and 40 kg. of hydrochloric acid 30% at 0° C. and combined with a soda alkaline solution of 9.5 kg. of phenol. After completion of the coupling, which occurs in a short time, it is heated to 75° C., treated with excess of soda or soda lye and thereupon with 50 kg. of p-toluene sulpho-chloride, maintained at this temperature until the esterification has been completed, salted out, filtered and dried. The new dyestuff, a dark powder, dissolves violet in water, blue in concentrated sulphuric acid and dyes wool in the acid bath in beautiful, light-fast violet shades.

When instead of phenol there is used m-cresol, 1,3,6-xylenol or other substitution products of phenol capable of being coupled in the p-position such as o-cresol, resorcinol-monoalkyl ethers etc., similar dyestuffs are formed, as also when using other analogous mono-azo dyestuffs, such as for example those produced from 2- or 3-methoxy- or ethoxy- or 3-methyl-4-acetylamino-1-amino-benzene-6-sulphonic acid and 2:8-amino-naphthol-6-sulphonic acid, instead of the above mentioned mono-azo dyestuff from 4-acetyl-amino-1-amino-benzene-6-sulphonic acid and 2:8-amino-naphthol-6-sulphonic acid. With the same result there may be used other aryl sulpho-chlorides of the benzene series such as for example benzene-, or p-chlorobenzene sulpho-chloride.

Example 2

29.3 kg. of 4-amino-4'-hydroxyazo-benzene-3-sulphonic acid (obtained for example from 4-oxalyl-amino-1-aminobenzene-3-sulphonic acid by diazotising and coupling with phenol and saponifying, or from 4-nitro-1-aminobenzene-3-sulphonic acid by diazotising, coupling with phenol and reduction of the nitro group, or from 4-chloro-1-aminobenzene-3-sulphonic acid by diazotising and coupling with phenol and exchange of the 4-position halogen atom by the amino group, by heating with ammonia under pressure) are diazotised as usual with 7 kg. of sodium nitrite and 30 kg. of hydrochloric acid 30% and thereupon coupled in acid solution or suspension with 23.9 kg. of 2:8-amino-naphthol-6-sulphonic acid. After 24 hours it is made alkaline with soda or soda lye, heated to 75° C. and the phenolic hydroxyl group esterified by means of 40 kg. p-toluene sulpho-chloride. After the reaction is completed it is salted out, filtered and dried. The dyestuff produced is identical with that of Example 1.

In this case also the various components can be varied as is indicated in Example 1.

What I claim is:

1. The disazo dyestuffs corresponding in the free state to the formula $$A.SO_2.O.R.N=N-\underset{SO_3H}{\underset{|}{\bigcirc}}\overset{X\quad Y}{\underset{}{}}-N=N-\underset{HO-}{\underset{|}{\bigcirc\bigcirc}}\overset{NH_2}{\underset{SO_3H}{}}$$

wherein

X represents a member of the group consisting of hydrogen, an alkyl- and alkoxy group, Y represents a member of the group consisting of hydrogen and an alkoxy-group (one of X and Y being at the most different from hydrogen)

R represents the residue of a phenol, coupled in the para-position and

A represents an aromatic residue of the benzene series, being dark powders, soluble in water with reddish to bluish-violet color, dyeing animal fibres in an acid bath violet shades of good light fastness.

2. The disazo dyestuffs corresponding in the free state to the formula $$CH_3-\bigcirc-SO_2.O-\bigcirc\overset{X\quad Y}{\underset{SO_3H}{}}-N=N-\underset{HO-}{\underset{}{\bigcirc\bigcirc}}\overset{NH_2}{\underset{SO_3H}{}}$$

wherein

X represents a member of the group consisting of hydrogen, an alkyl- and alkoxy group and Y represents a member of the group consisting of hydrogen and an alkoxy-group (one of X and Y being at the most different from hydrogen), being dark powders, soluble in water with reddish to bluish-violet color, dyeing animal fibres in an acid bath violet shades of good light fastness.

3. The disazo dyestuff corresponding in the free state to the formula $$CH_3-\bigcirc-SO_2.O-\bigcirc-N=N-\underset{SO_3H}{\underset{|}{\bigcirc}}-N=N-\underset{HO-}{\underset{|}{\bigcirc\bigcirc}}\overset{NH_2}{\underset{SO_3H}{}}$$

being a dark powder, dissolving in water with a violet color, in concentrated sulphuric acid with a blue color and dyeing wool in the acid bath in beautiful, light-fast violet shades.

4. The disazo dyestuff corresponding in the free state to the formula $$CH_3-\bigcirc-SO_2.O-\bigcirc-N=N-\underset{SO_3H}{\overset{OCH_3}{\bigcirc}}-N=N-\underset{HO-}{\underset{|}{\bigcirc\bigcirc}}\overset{NH_2}{\underset{SO_3H}{}}$$

being a dark powder, dissolving in water with a bluish violet color, in concentrated sulphuric acid with a violet color and dyeing wool in the acid bath in beautiful, light-fast bluish-violet shades.

5. The disazo dyestuff corresponding in the free state to the formula $$CH_3-\bigcirc-SO_2.O-\bigcirc-N=N-\underset{SO_3H}{\overset{OCH_3}{\bigcirc}}-N=N-\underset{HO-}{\underset{|}{\bigcirc\bigcirc}}\overset{NH_2}{\underset{SO_3H}{}}$$

being a dark blue powder, dissolving in water with a blue color, in concentrated sulphuric acid with a dark reddish blue color and dyeing wool in the acid bath in beautiful light-fast bluish violet shades.

ADOLF KREBSER.